United States Patent [19]

Susuki et al.

[11] 3,725,336
[45] Apr. 3, 1973

[54] THERMOPLASTIC COMPOSITION CONTAINING COPRECIPITATED FILLERS AND METHODS OF MAKING THE FILLERS

[75] Inventors: Rinnosuke Susuki, Tokyo; Hiroshi Hoshi, Chiba-ken; Jiro Saito, Tokyo; Keiichi Murakami, Miyagi-ken; Michio Hirakawa, Chiba-ken, all of Japan

[73] Assignee: Lion Fat & Oil Co., Ltd., Tokyo, Japan

[22] Filed: Apr. 23, 1971

[21] Appl. No.: 136,762

[30]     Foreign Application Priority Data

Apr. 25, 1970   Japan..................................45/35748
Apr. 25, 1970   Japan..................................45/35749

[52] U.S. Cl. ..............260/41 R, 106/306, 106/308 B
[51] Int. Cl..............................................C08f 45/04
[58] Field of Search ..........106/306, 308 B; 260/41 R

[56]              References Cited

UNITED STATES PATENTS 3,445,259    5/1969    Brooks et al. .........................106/306

*Primary Examiner*—Morris Liebman
*Assistant Examiner*—P. N. Thomas, Jr.
*Attorney*—Woodhams, Blanchard and Flynn

[57]              ABSTRACT

A method for the preparation of a filler to be used with thermoplastic resins comprising a process of making the mixture of two or three members selected from the group consisting of sulfur dioxide, sulfur trioxide and carbon dioxide act on calcium hydroxide in the presence of water or a process of making either sulfur dioxide or sulfur trioxide or the mixture thereof act on calcium carbonate in the presence of water. Thermoplastic compositions containing the coprecipitated filler mixture have superior physical characteristics when compared to thermoplastic compositions which contain filler mixtures mechanically mixed.

4 Claims, 1 Drawing Figure

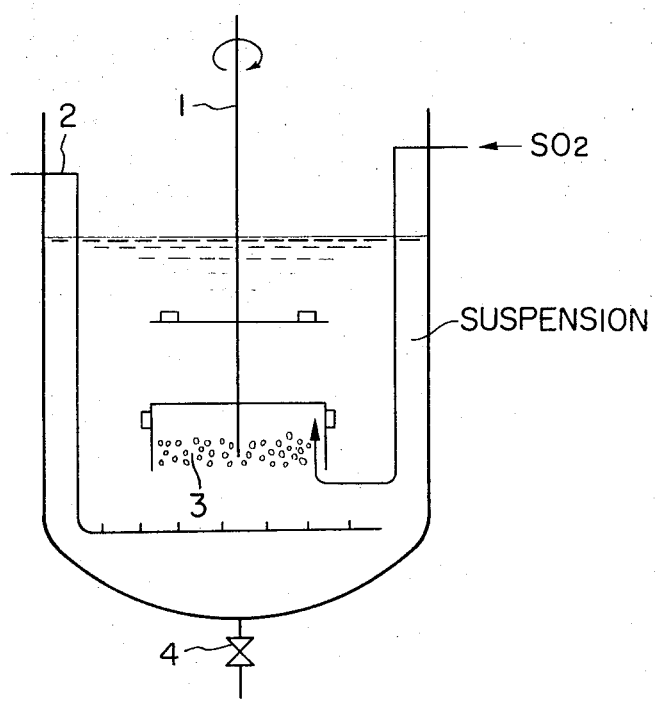

THERMOPLASTIC COMPOSITION CONTAINING COPRECIPITATED FILLERS AND METHODS OF MAKING THE FILLERS

BACKGROUND OF THE INVENTION a. Field of the Invention

The present invention relates to a method for the preparation of a filler to be used with thermoplastic resins wherein the compounding of the filler with the thermoplastic resins imparts an improved tensile strength, tear resistance and rigidity to the thermoplastic resins and wherein the filler can be mixed with the resins in large quantities without damaging the excellent properties inherent to such resins.

b. Description of the Prior Art

It has been known to add one or more members selected from calcium carbonate, talc, clay, diatomaceous earth and carbon black to thermoplastic resins with the object being to improve the mechanical strength, weather resistance, heat resistance and chemical resistance of products made therefrom, and also with another object being to extend the resin by adding such a filler in large quantities to reduce the cost. However, the aforementioned fillers which have hitherto been used do not work satisfactorily enough to improve the properties of the resin proportionately with the increase in the quantity added thereto, and these conventional fillers have a defect of working in such a disadvantageous way as to damage the thermoplasticity which is an inherent property of thermoplastic resins.

There has been also developed a filler whose surface is treated with a surface active agent to prevent the thermoplasticity inherent to the resin from being reduced even when the filler is used in large quantities; however, though it is true that such a filler whose surface is treated with a surface active agent as, for instance, an activated calcium carbonate, can be used in the thermoplastic resin in a considerably large quantity without damaging the excellent properties of the resin with some success, even this does not produce satisfactory results. Furthermore, the manufacturing cost of such a filler is so high that it does not serve for reduction of the cost of a resin product which is one of the objects of fillers.

SUMMARY OF THE INVENTION

It is an object of this invention to provide a method of preparing a filler which improves the mechanical strength, weather resistance, heat resistance and chemical resistance of thermoplastic resins without damaging the thermoplasticity and other properties of the resin when the filler is added to the resin in large quantities, wherein said filler comprises a mixture which consists of calcium carbonate and either one or both of calcium sulfite and calcium sulfate, the foregoing components having been obtained respectively by means of a process of making a mixture of two or three members selected from the group consisting of sulfur dioxide, sulfur trioxide and carbon dioxide act on calcium hydroxide in the presence of water or a process of making either sulfur dioxide or sulfur trioxide or a mixture thereof act on calcium carbonate in the presence of water. The mixture thus prepared is most suitable for a filler because its components are mixed up in a far better condition of uniformity as compared with the mixture of dried component particles prepared separately.

It has heretofore been generally known that calcium carbonate and calcium sulfate are used as a filler suitable for synthetic resins and they are also used in combination as a mixture. It has, however, been proved by the inventors of the present invention that a mixture of calcium carbonate and calcium sulfate that is obtained as a mixture at the time of preparation shows more excellent performance as a filler than a mixture of calcium carbonate and calcium sulfate which are prepared separately and then mixed. It is therefore noteworthy to understand that the present invention provides a method of preparing a filler specifically designed to be used effectively as a filler for thermoplastic resins. A specially distinctive feature of the present invention lies in the facts that a new type of calcium sulfite specifically suitable for a filler has been developed and that the respective components of the filler thus developed can be obtained in the form of a mixture.

The detailed explanations as to the processes practised according to the present invention are given hereunder: (1) a mixed gas comprising two or three members selected from the group consisting of sulfur dioxide, sulfur trioxide and carbon dioxide is sent into a suspension of calcium hydroxide until the pH attains to about 10–5. At this time the following reactions take place:

$$2Ca(OH)_2 + SO_2 + CO_2 \rightarrow CaSO_3 \cdot 1/2H_2O + CaCO_3 + 3/2H_2$$

$$2Ca(OH)_2 + SO_3 + CO_2 \rightarrow CaSO_4 \cdot 2H_2O + CaCO_3$$

$$1/2H_2O + 2Ca(OH)_2 + SO_2 + SO_3 \rightarrow CaSO_3 \cdot 1/2H_2O + CaSO_4 \cdot 2H_2O$$

$$3Ca(OH)_2 + SO_2 + SO_3 + CO_2 \rightarrow CaSO_3 \cdot 1/2H_2O + CaSO_4 \cdot 2H_2O +_3 + 1/2H_2O$$

whereby the mixtures of filler components which respectively comprise either two or three members selected from calcium sulfite, calcium carbonate and calcium sulfate are obtained. In another way (2), a gas comprising either sulfur dioxide or sulfur trioxide or a mixture of these two gases is introduced into a suspension of calcium carbonate until the pH attains to about 10 – 5. On this occasion, the following reactions take place:

$$1/2H_2O + CaCO_3 + SO_2 \rightarrow CaSO_3 \cdot 1/2H_2O + CO_2$$

$$2H_2O + CaCO_3 + SO_3 \rightarrow CaSO_4 \cdot 2H_2O + CO_2$$

$$5/2H_2O + 2CaCO_3 + SO_2 + SO_3 \rightarrow CaSO_3 \cdot 1/2H_2O + CaSO_4 \cdot 2H_2O + 2CO_2$$

whereby either of calcium sulfite and calcium sulfate or a mixture of these two are formed. Such mixtures of fillers as mentioned in the foregoing which consist of the remaining calcium carbonate not subjected to the reaction in the afore-mentioned process are also obtained. In either of these cases, the amount of calcium hydroxide or calcium carbonate to be contained in the suspension is not limited, and preferably is within the range of about 5 – 20 percent by weight. The sulfur oxide gas to be used in the reaction may be prepared by simply burning solid sulfur, or by burning such a sulfide as hydrogen sulfide or by any other means of preparation. The temperature of the suspension at the time of the introduction of the gas should be controlled approximately between 70°C. and 100°C. to obtain the best results.

Furthermore, in the practice of the present invention sulfuric acid can be used in place of sulfur trioxide gas. In this case no gas is introduced into the suspension and sulfuric acid is added to the abovementioned suspension. Sulfurous acid can likewise be used in place of sulfur dioxide gas.

The fillers thus obtained are used by means of kneading them with such thermoplastic resins as, for instance, polyethylene, copolymer of ethylene and propylene, polyvinyl chloride and polypropylene. In this case, the amount of the filler to be kneaded into a thermoplastic resin may be selected in the range of 50 percent by weight to 90 percent by weight of the total amount of the thermoplastic resin composition.

BRIEF DESCRIPTION OF THE DRAWING

The drawing is a schematic view showing an example of the apparatus to be used in the practice of the present invention.

DESCRIPTION OF THE PREFERRED EMBODIMENT

Example 1
Method A

A mixture of calcium sulfite and calcium sulfate was prepared with the use of a reactor which is shown in the attached drawing (in which an agitator is indicated by 1, steam port 2, vent hole 3, and discharge gate 4) wherein a mixed gas of sulfur dioxide and sulfur trioxide was introduced into a 10 percent suspension of calcium hydroxide and the reaction was conducted until the value of pH reached 9.5. The composing ratio of calcium sulfite to calcium sulfate was adjusted by modifying the mixing ratio of sulfur dioxide to sulfur trioxide.

Method B

Calcium sulfate was obtained according to Method A by means of introducing sulfur trioxide into 10 percent suspension of calcium hydroxide and letting the reaction continue until the pH value reached 9.0. Similarly, calcium sulfite was obtained from the reaction between calcium hydroxide and sulfur dioxide. The resulting calcium sulfate and calcium sulfite were mixed to prepare a mixture having the same mixing ratio as that of the mixture prepared according to Method A. Using the respective mixtures prepared according to the Method A and Method B as a filler, plastics cups which have an external diameter of 73 mm., a thickness of 1 mm., and a height of 70 mm. were prepared from a resinous composition having the composition as mentioned below: each of the fillers was mixed with the under-mentioned ingredients by the use of a Henschel mixer and was then subject to extrusion molding under the conditions mentioned in the following to mold the aforementioned cups.

```
Composition (% by weight):
    PVC                 32%
    DOP                 10
    Stabilizer
    (of lead system)    3
    SBR                 5
    Filler              50
Molding conditions:
    Temperature of resin    200°C.
    Extrusion pressure      30 kg./cm.²
    Molding cycle           10 sec./cycle
    Motor amperage          10 amp.
```

Compression load tests were applied to the cups thus molded to determine the load at break.

| $CaSO_3/CaSO_4$ Ratio | 80/20 | | 50/50 | | 20/80 | |
|---|---|---|---|---|---|---|
| Method of Preparation | A | B | A | B | A | B |
| Compression Load Test (kg) | 180 | 160 | 182 | 171 | 206 | 190 |

As is clearly shown in the above table, the molded products made from the thermoplastic resinous compound which contained the mixture prepared according to Method A had a physical property superior to that of the molded products which contained the mixture prepared according to Method B.

Example 2
Method A

With the use of the reactor which was used in Example 1, sulfur trioxide was added to 10 percent suspension of calcium hydroxide and 50 percent of said calcium hydroxide was converted into calcium sulfate and then sulfur dioxide was introduced into the system to obtain a mixture of calcium sulfite and the rest of said calcium hydroxide.

Method B

According to the same method as applied in Example 1, Method B, calcium sulfate and calcium sulfite were obtained and then they were mixed at the same mixing ratio as one applied to the mixture prepared according to Method A of this example.

Method C

A mixture of calcium sulfate and calcium sulfite was obtained according to Example 1 wherein said sulfur trioxide is 30 percent sulfuric acid, thus making 50 percent of calcium hydroxide into calcium sulfate, into which system sulfur dioxide was additionally introduced to complete the process.

Method D

Calcium sulfate was prepared by neutralizing 10 percent suspension of calcium hydroxide with the use of the reactor which was used in Example 1. Calcium sulfate thus prepared and calcium sulfite which had been prepared according to Example 1, Method B, were mixed together at the same mixing ratio as that of the mixture obtained according to Method C of this example. By using the respective fillers prepared according to Methods A, B, C and D mentioned in the foregoing, round bottles which has a weight of 40 g., JIS 3,000C, at the composition mentioned below as per following processing conditions:

```
Composition (% by volume):
    Commercially available medium/low
    pressure process polyethylene    70%
    Filler                           30%
Kneading conditions:
    With the use of an open type
    roll mill:
    Number of revolution:        16 rpm: 20 rpm
    Temperature:                 160°C.
    Time required:               15 min.
Molding conditions:
    Screw: Using Cross Law F type    40 mm.
    Resin temperature:               200°- 240°C.
    Screw rotation frequency:        20 rpm
    Motor amperage:                  16 amp.
    Molding cycle:                   20 sec./cycle
```

30 cc. of 10 percent aqueous solution of sodium alkylbenzenesulfonate was put in the polyethylene bottles thus molded and the time required for the bursting of the respective bottles after they had been placed in the air bath whose temperature was maintained at 65°C. was computed, the results of which are as follows:

| Method for the preparation of a filler | Time required for bursting (hr) |
|---|---|
| A | 12 |
| B | 6 |
| C | 12 |
| D | 7 |

As seen from the above results, it was made clear that those molded products made from the resin composition containing the fillers prepared according to Method A and Method C had more excellent physical properties than those molded products containing the fillers prepared according to Method B and Method D.

Example 3
Method A

A mixture of calcium sulfite and calcium carbonate was obtained by introducing a mixture of sulfur dioxide and carbon dioxide into 10% suspension of calcium hydroxide and making the reaction proceed until the pH value reached 9.5 in the same method as in the case of Example 1, Method A. The composing ratio of calcium sulfite to calcium carbonate was adjusted by modifying the mixing ratio of sulfur dioxide to carbon dioxide.

Method B

Calcium carbonate was obtained according to the aforementioned Method A wherein carbon dioxide was sent into 10 percent suspension of calcium hydroxide and the reaction was made to proceed until the value of pH reached 9.5. Calcium carbonate thus obtained was mixed with calcium sulfite obtained according to Example 1, Method B, to make a mixture whose mixing ratio corresponded exactly to the mixing ratio of the mixture prepared according to Method A. The mixture prepared according to Method A and Method B was kneaded as a filler with a copolymeric resin according to the composition mentioned below with the use of an open type roll mill. The mixed resin was then subjected to calendering under the molding conditions indicated in the following to mold sheets having a thickness of 0.2 mm.

Composition:
  Commercially obtainable ethylene
    propylene copolymer:       50% by volume
  Filler:                      50% by volume
Kneading conditions:
  Temperature of the rolls:    165±5°C.
  Rotation ratio of rolls:     1:1.2
  Time required for kneading:  10 min.
Calendering conditions:
  Inverted L type 4 calender system was used.
  Rotation ratio:              1:1.1:1.2:1.4
Temperature of rolls:
  Side roll:                   180°C.
  Top roll:                    175°C.
  Center roll:                 175°C.
  Bottom roll:                 160°C.
Calendering speed:             50 m./min.

The physical properties of the products thus molded were determined as follows:

| $CaSO_3 \cdot H_2O/CaCO_3$ Ratio | 80/20 | | 50/50 | | 20/80 | |
|---|---|---|---|---|---|---|
| Preparation Method | A | B | A | B | A | B |
| Tensile strength: Machine Direction (kg./cm$^2$) | 482 | 460 | 390 | 385 | 350 | 340 |
| Traverse Direction | 301 | 300 | 280 | 250 | 221 | 220 |
| Tear resistance: (g./0.2mm.) Machine Direction | 1600 | 1530 | 1200 | 1200 | 1400 | 1300 |
| Traverse Direction | 380 | 320 | 300 | 280 | 280 | 230 |

Example 4
Method A

According to Example 1, Method A, a mixed gas comprising sulfur dioxide, sulfur trioxide and carbon dioxide was blown into 10 percent suspension of calcium hydroxide and the reaction was made to proceed until the pH value of 8.0 was reached to obtain a mixture of calcium sulfite, calcium sulfate and calcium carbonate. The mixing ratio between them was adjusted by changing the mixing ratio between sulfur dioxide, sulfur trioxide and carbon dioxide which formed the mixture of gases introduced into the suspension.

Method B

Calcium sulfite and calcium sulfate prepared according to Example 1, Method B and calcium carbonate prepared according to Example 3, Method B were mixed together at the same ratio as that of the mixture obtained according to Method A. The mixture which was obtained according to Method A and Method B was used as a filler and was kneaded with commercially available medium/low pressure process polyethylene to be molded into sheets having a thickness of 0.2 mm.

Composition:
  Commercially available medium/low
    pressure process polyethylene:   45% by volume
  Ethylene propylene rubber:         5% by volume
  Filler:                            50% by volume
Molding conditions:
  Open type two-roll system was used
  Temperature on the surface of the rolls:  165±5°C.
  Processing time:                           10 min.
  Rotation ratio of the rolls:               1:1.2

The physical properties of molded products thus prepared were as follows:

| $CaSO_3:CaSO_4:CaSO_3$ | 50:25:25 | | 25:50:25 | | 25:25:50 | |
|---|---|---|---|---|---|---|
| Preparation Method | A | B | A | B | A | B |
| Tensile strength: Machine Direction (kg./cm.$^2$) | 414 | 398 | 321 | 320 | 311 | 280 |
| Traverse Direction | 360 | 342 | 216 | 196 | 180 | 180 |
| Tear resistance (g./0.2 mm.) Machine Direction | 1200 | 1100 | 1060 | 980 | 920 | 860 |
| Traverse Direction | 280 | 260 | 241 | 221 | 180 | 150 |

Since sulfides, which have heretofore been thrown away, sulfur dioxide and sulfur trioxide are utilized in the preparation of the materials according to the present invention, it has now been made possible to contribute to the general approaches to air and water pollution control as well as to minimize the manufacturing cost of the products. Furthermore, with the addition of a mixture type of filler in great quantities prepared according to the present invention to the thermoplastic resin, the physical properties of the resin such as mechanical strength, weather resistance, chemical resistance, etc. can be greatly improved without damaging the thermoplasticity inherent to said group of resins.

Example 5
Method A

Sulfur dioxide gas was sent into 10 percent by weight suspension of calcium carbonate having a particle size less than 50 μ. with the use of the reactor described in Example 1 to induce the following reaction:

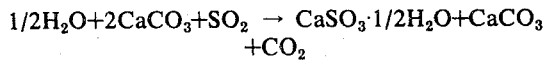

$$1/2H_2O + 2CaCO_3 + SO_2 \rightarrow CaSO_3 \cdot 1/2H_2O + CaCO_3 + CO_2$$

Reaction conditions:
Temperature: 90°C.
Time: 30 min.
Concentration of SO₂ gas: 99%
Rotation ratio of atomizer: 500 rpm On this occasion the required mixture of calcium carbonate and calcium sulfite was obtained by varying the amount of sulfur dioxide gas introduced into the suspension.

After the mixture thus obtained was subjected to dehydration and desiccation, 50 percent by volume of the mixture was kneaded with commercially available medium/low pressure process polyethylene to form sheets having a thickness of 0.2 mm. under the conditions mentioned below.

Kneader used:
19φ × 200 mm. open type roll mill (two rolls)
Rotation ratio of the rolls: 1:1.2
Kneading conditions:
Temperature on the roll surface: 160°C.–170°C.
Kneading time: 8 min.
Sheet processing conditions:
Temperature on the roll surface: 160°C.–165°C.
Clearance between the rolls: 0.16 mm.

Method B

With the use of the reactor mentioned in Method A, sulfur dioxide gas was introduced into 10 percent suspension of calcium hydroxide and the reaction was made to proceed until the value of pH reached 9.0 to obtain calcium sulfite. The reaction formula mentioned below was followed on this occasion:

$$Ca(OH)_2 + SO_2 \rightarrow CaSO_3 \cdot 1/2H_2O + 1/2H_2O$$

Reaction conditions: as per Method A

On the other hand, precipitated calcium carbonate was prepared by means of introduction of carbon dioxide into 10% suspension of calcium hydroxide according to the reaction similar to the aforementioned one. The reaction formula is as follows:

$$CA(OH)_2 + CO_2 \rightarrow CaCO_3 + H_2O$$

Reaction conditions: as per Method A

Calcium sulfite and calcium carbonate thus obtained were mixed at the same mixing ratio as that of the mixture prepared according to Method A. The mixture was then kneaded and molded into sheet having a thickness of 0.2 mm. under the same kneading and molding conditions as those adopted to Method A.

The physical properties of the sheets prepared according to Method A were measured in comparison with those of the sheets prepared according to Method B and the results obtained from the measurements were as follows:

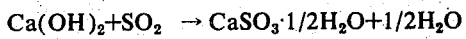

| CaSO₃·H₂O:CaCO₃ | | 80:20 | | 60:40 | | 40:60 | | 20:80 | |
|---|---|---|---|---|---|---|---|---|---|
| Method | | A | B | A | B | A | B | A | B |
| Tensile strength (kg./cm.²) | M.D.[1] | 460 | 386 | 380 | 368 | 321 | 286 | 280 | 246 |
| | T.D.[2] | 218 | 208 | 210 | 192 | 186 | 162 | 176 | 162 |
| Elongation (%) | M.D. | 12 | 13 | 11 | 12 | 10 | 11 | 8 | 8 |
| | T.D. | 6 | 8 | 6 | 6 | 5 | 7 | 3 | 3 |
| Tear resistance (g./0.2 mm.) | M.D. | 16211400 | 14801220 | 1060 | 786 | 823 | 408 | | |
| | T.D. | 308 | 281 | 280 | 280 | 220 | 231 | 186 | 146 |
| Rigidity (g.) | M.D. | 68006600 | 69006700 | 72006900 | 86008300 | | | | |
| | T.D. | 53005000 | 58005500 | 53005400 | 62006200 | | | | |

Notes: [1]M.D. = Machine Direction
[2]T.D. = Traverse Direction

It has been definitely shown by the results listed in the above table that the physical properties of the sheets molded from medium/low pressure process polyethylene kneaded with the mixture comprising calcium sulfite and calcium carbonate prepared at the same time in a single reaction system were found to be better than the physical properties of the sheet molded likewise from the same plastic material containing a mixture of calcium sulfite and calcium carbonate which had been prepared separately in the different reaction systems.

Example 6

Method A

A mixed gas comprising sulfur dioxide and sulfur trioxide (having a mixing ratio of 50:50 by volume) was introduced into 10 percent suspension of calcium carbonate whose particle size was less than 5 μ according to the method of Example 1 to carry on the reaction as per following reaction formulas:

$$1/2H_2O + 2CaCO_3 + SO_2 \rightarrow CaSO_3 \cdot 1/2H_2O + H_2O + CO_2 + aCO_3$$

$$2H_2O + 2CaCO_3 + SO_3 \rightarrow CaSO_4 \cdot 2H_2O + CO_2 \cdot CaCO_3$$

A mixture of calcium sulfite, calcium sulfate and calcium carbonate was obtained from the reactions.

The composition of calcium sulfite plus calcium sulfate to calcium carbonate was controlled by adjusting the amount of the respective gases.

Method B

Calcium sulfite and calcium carbonate prepared according to Example 5, Method B, and calcium sulfate (obtained from the reaction taking place between calcium hydroxide and sulfur trioxide according to Example 5, Method B) were mixed at the same mixing ratio as that of the mixture obtained according to Method A.

The mixtures obtained according to Method A and Method B were respectively kneaded with polyvinyl chloride and were then molded into sheets having a thickness of 0.2 mm. under the same kneading conditions and molding conditions as those adopted in Example 1, Method A.

Composition of the molding materials:
PVC: 32 v/v
DOP: 15 v/v
Stabilizer (of lead system): 3 v/v
Filler: 50 v/v The physical properties of the respective sheets are given in the following table:

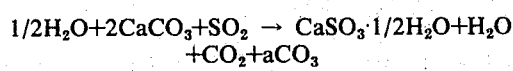
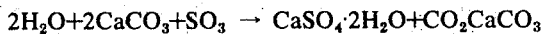

| CaSO₃·H₂O:CaSO₄:CaCO₃ | | 50:25:25 | | 25:50:25 | | 25:25:50 | |
|---|---|---|---|---|---|---|---|
| Method | | A | B | A | B | A | B |
| Tensile Strength (kg./cm.²) | M.D. | 410 | 380 | 320 | 300 | 280 | 270 |
| | T.D. | 280 | 261 | 210 | 186 | 200 | 186 |
| Elongation (%) | M.D. | 12 | 12 | 8 | 7 | 7 | 4 |
| | T.D. | 6 | 7 | 4 | 4 | 2 | 1 |

| Tear resistance (g./0.2 mm.) | M.D. | 1200 | 986 | 1060 | 920 | 960 | 860 |
|---|---|---|---|---|---|---|---|
| | T.D. | 400 | 328 | 380 | 330 | 290 | 290 |
| Rigidity (g.) | M.D. | 126 | 118 | 150 | 142 | 178 | 160 |
| | T.D. | 116 | 109 | 170 | 160 | 200 | 181 |

Note: M.D. = Machine direction
T.D. = Traverse direction

As the above table shows clearly, it was found that the sheets molded from polyvinyl chloride kneaded with a mixture consisting of calcium sulfite, calcium sulfate and calcium carbonate which had been prepared from the single reaction system had physical properties better than those of the sheets molded from polyvinyl chloride kneaded with a mixture consisting of calcium sulfite, calcium sulfate and calcium carbonate which had been prepared separately from the different reaction systems.

Example 7

Method A $CaSO_4$ was prepared according to Example 5, Method A wherein sulfur dioxide in place of sulfur trioxide gas was introduced.

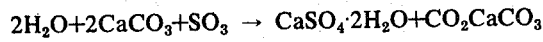

$$2H_2O + 2CaCO_3 + SO_3 \rightarrow CaSO_4 \cdot 2H_2O + CO_2 CaCO_3$$

A mixture consisting of calcium carbonate and calcium sulfate was obtained by adjusting the amount of sulfur trioxide which was introduced into the system.

Method B

A mixture was prepared by mixing calcium sulfate obtained according to Example 6, Method B, with calcium carbonate obtained according to Example 5, Method B, in such a way as to have the same composition as that of the mixture prepared according to Method A.

The fillers prepared according to Method A and Method B were mixed with polypropylene in Henschel mixer at the mixing ratio mentioned below and cups which had an external diameter of 73 mm., thickness of 1 mm. and height of 70 mm. were injection molded under the molding conditions mentioned in the following.

Mixing ratio:
    Polypropylene    55% by volume
    Ethylene Propylene Rubber    5% by volume
    Filler    40% by volume Molding conditions:
    Resin temperature    280°C.
    Injection pressure    28 kg./cm.²
    Cooling time    10 sec./cycle The cups thus molded were put to the compression load test to determine the load at break.

| $CaCO_3/CaSO_4$ | 80/20 | | 50/50 | | 20/80 | |
|---|---|---|---|---|---|---|
| Method | A | B | A | B | A | B |
| Compression load (kg.) | 121 | 118 | 112 | 101 | 106 | 98 |

As observed apparently from the above results, the molded products in which the mixture prepared according to Method A for the filler were proved to have the physical property better than that of the molded products which contained the mixture prepared according to Method B.

Since sulfides which have hitherto been useless and thrown away, sulfur dioxide and sulfur trioxide are utilized for the preparation of the resinous compound in the practice of the present invention, it has now been made possible to contribute to the general approaches to air and water pollution control as well as to reduce the manufacturing cost of the products. Furthermore, the addition of a mixture type of filler prepared according to the present invention to a thermoplastic resin in large quantities, the physical properties of the resin such as mechanical strength, weather resistance, chemical resistance, etc. can be greatly improved without causing damages to the thermoplasticity inherent to the resin. This invention has another merit that, while using calcium carbonate as the material for the preparation of calcium sulfite and calcium sulfate, calcium carbonate which remains in the reaction system without having been subjected to the reaction can be utilized as part of the resinous composition prepared according to the present invention.

What we claim is:

1. A resin composition consisting essentially of a homogenous mixture of (A) from 10 to 50 percent by weight of a thermoplastic resin and the balance being (B) a mixture of at least two coprecipitated fillers selected from the group consisting of calcium sulfite, calcium sulfate and calcium carbonate, said filler mixture having been prepared by simultaneously introducing (1.) at least two members selected from the group consisting of (a) sulfur dioxide or sulfurous acid, (b) sulphur trioxide or sulfuric acid, and (c) carbon dioxide, into (2.) an aqueous suspension of calcium hydroxide, until the pH of the suspension reaches approximately 10 – 5.

2. A composition as defined in claim 1, wherein the thermoplastic resin is selected from the group consisting of polyethylene, ethylene propylene copolymer, polyvinyl chloride and polypropylene.

3. A resin composition consisting essentially of (A) a homogenous mixture of from 10 to 50 percent by weight of a thermoplastic resin and the balance being (B) a filler mixture consisting of (1) calcium carbonate and (2) at least one member selected from the group consisting of calcium sulfite and calcium sulfate, said filler mixture having been prepared by introducing at least one member selected from the group consisting of (a) sulfur dioxide or sulfurous acid and (b) sulfur trioxide or sulfuric acid, into an aqueous suspension of the calcium carbonate, until the pH of the suspension reaches about 10 – 5.

4. A composition as defined in claim 3, wherein said thermoplastic resin is selected from the group consisting of polyethylene, ethylene propylene copolymer, polyvinyl chloride and polypropylene.

* * * * *